US009066348B2

(12) United States Patent
Venkatachalam

(10) Patent No.: US 9,066,348 B2
(45) Date of Patent: Jun. 23, 2015

(54) DEVICE, SYSTEM, AND METHOD FOR FAST NETWORK ENTRY FOR WIRELESS DEVICES IN IDLE MODE

(75) Inventor: Muthaiah Venkatachalam, Beaverton, OR (US)

(73) Assignee: INTEL COPORATION, Santa Clara, CA (US)

(*) Notice: Subject to any disclaimer, the term of this patent is extended or adjusted under 35 U.S.C. 154(b) by 2377 days.

(21) Appl. No.: 11/907,813

(22) Filed: Oct. 17, 2007

(65) Prior Publication Data

US 2008/0096614 A1    Apr. 24, 2008

Related U.S. Application Data

(60) Provisional application No. 60/852,892, filed on Oct. 17, 2006.

(51) Int. Cl.
H04W 76/04    (2009.01)
H04W 52/02    (2009.01)

(52) U.S. Cl.
CPC ........ H04W 76/046 (2013.01); *H04W 52/0216* (2013.01); *H04W 52/0219* (2013.01)

(58) Field of Classification Search
None
See application file for complete search history.

(56) References Cited

U.S. PATENT DOCUMENTS

| 7,302,264 | B2* | 11/2007 | Yoon et al. ............ 455/436 |
| 7,590,421 | B2* | 9/2009 | Ryu et al. ............ 455/436 |
| 7,720,038 | B2* | 5/2010 | Bennett ............ 370/338 |
| 7,764,660 | B2* | 7/2010 | Verma et al. ............ 370/338 |
| 7,778,640 | B2* | 8/2010 | Cho et al. ............ 455/435.1 |
| 7,809,381 | B2* | 10/2010 | Aborn et al. ............ 455/456.5 |
| 7,830,850 | B2* | 11/2010 | Twitchell, Jr. ............ 370/338 |
| 2002/0130868 | A1* | 9/2002 | Smith ............ 345/440 |
| 2005/0058108 | A1* | 3/2005 | Ekberg et al. ............ 370/338 |
| 2005/0239461 | A1* | 10/2005 | Verma et al. ............ 455/435.1 |
| 2006/0112113 | A1* | 5/2006 | Gu et al. ............ 707/100 |
| 2006/0176824 | A1* | 8/2006 | Laver et al. ............ 370/241 |
| 2006/0177005 | A1* | 8/2006 | Shaffer et al. ............ 379/67.1 |
| 2006/0177007 | A1* | 8/2006 | Vaghar et al. ............ 379/67.1 |
| 2006/0182055 | A1* | 8/2006 | Coffee et al. ............ 370/328 |
| 2006/0193264 | A1* | 8/2006 | Bonar et al. ............ 370/252 |
| 2006/0287948 | A1* | 12/2006 | Ernst ............ 705/39 |
| 2007/0143373 | A1* | 6/2007 | D'Souza et al. ............ 707/204 |
| 2008/0153491 | A1* | 6/2008 | Cho et al. ............ 455/435.1 |

OTHER PUBLICATIONS

WIMAX Form, "WIMAX Forum Network Architecture Stage 3: Detailed Protocols and Procedures—Release 1.1.1", Sep. 14, 2007, Sections 4.10.4.1 and 4.10.4.2, pp. 265-272.

* cited by examiner

*Primary Examiner* — Alpus H Hsu
*Assistant Examiner* — Hooman Houshmand
(74) *Attorney, Agent, or Firm* — Shichrur & Co.

(57) ABSTRACT

A method, apparatus and system for, in a first wireless device, storing network resources in local memory for a second wireless device while the second wireless device is in an idle mode of operation, receiving a request from the second wireless device to exit the idle mode of operation, retrieving the network resources for the second wireless device from the local memory, and executing a network re-entry process using the retrieved network resources. A method, apparatus and system for, in a local memory of an active base station in a wireless network, storing network resources for an idle wireless mobile device in the wireless network, executing a network re-entry process for the idle wireless mobile device by retrieving and using the network resources for the idle wireless device, and signaling backend components of the wireless network to update the activation status of the wireless mobile device, wherein the network re-entry process is to be initiated prior to signaling the backend components.

25 Claims, 4 Drawing Sheets

DEVICE, SYSTEM, AND METHOD FOR FAST NETWORK ENTRY FOR WIRELESS DEVICES IN IDLE MODE

PRIOR APPLICATION DATA

The present application claims priority from U.S. provisional application No. 60/852,892, filed on Oct. 17, 2006, entitled "Fast Network Re-Entry for Mobile Wireless Devices in idle mode", which is incorporated by reference in its entirety.

BACKGROUND OF THE INVENTION

The consumption of power of wireless communication devices affects the battery life of the devices. Some wireless devices and/or networks may use an idle mode of operation in which components thereof, such as, receivers and/or transmitters, may be temporarily (e.g., for an idle period) turned off or inactive or in a low power state.

The wireless devices may exit the idle mode and re-enter the communication network, for example, based on a trigger, signal, passing of a predetermined idle period of time, and/or when the devices and/or networks have data to transmit or receive. In some network configurations, turning on, or waking up, a mobile device in an idle mode may involve significant signaling and/or time delays before the mobile device may re-enter the network as an active node.

A need exists for an efficient and relatively fast technique for a mobile device to re-enter communication networks.

BRIEF DESCRIPTION OF THE DRAWING

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
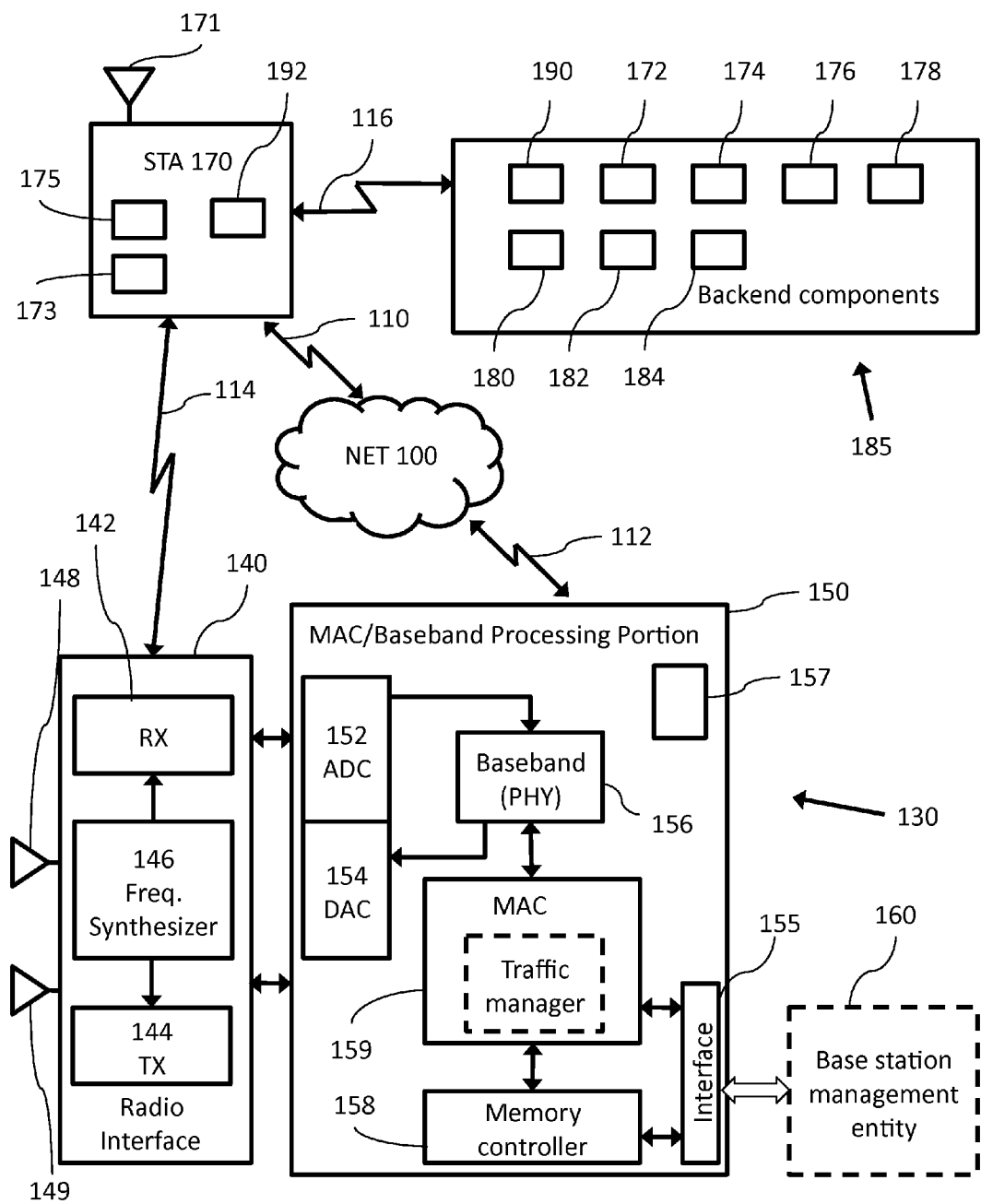
FIG. 1 is a schematic illustration of a wireless network and stations for communicating therein according to an embodiment of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that the present invention may be used in a variety of applications. Although the present invention is not limited in this respect, the circuits and techniques disclosed herein may be used in many apparatuses such as personal computers, stations of a radio system, wireless communication system, digital communication system, satellite communication system, and the like.

When a device exits an idle mode or another low power state or mode, the device and/or components thereof may, for example, wake-up, enter an active mode, begin active communication, re-enter a communication network, initialize, trigger, switch, and/or start a change in activity or mode, directly or indirectly, for example, from an off, inactive, lower power, power down and/or power save mode, to an on, active, higher power, power up, or ready mode. A device may be activated or may re-enter a network, for example, using a control unit or a power control unit in the device. In some embodiments, specific parts of the device may activate or deactivate according to embodiments of the invention, while other parts or the whole of the device may function according to conventional power schemes.

Although embodiments of the invention are not limited in this regard, the terms "deactivated" or "idle" mode as used herein may include, for example, a power save mode, a hibernation mode, a standby mode, a power conservation mode, reduced or low power mode, an efficiency mode, a "sleep" mode, a semi-operational mode, a semi-active mode, a partially-active mode, or other modes of operations in which a component, such as a transceiver or a sub-unit thereof, is not fully operational and/or active, or is completely inactive or off.

A wireless network according to some embodiments of the invention may facilitate wireless communication between each of one or more stations or other units within the network. Such a network may be configured to use one or more protocols specified in by the Institute of Electrical and Electronics Engineers (IEEE) 802.11™ standards ("IEEE Standard for Wireless LAN Medium Access Control (MAC) and Physical Layer (PHY) Specification. 1999 Edition", reaffirmed Jun. 12, 2003), such as IEEE 802.11a™-1999; IEEE 802.11b™-1999/Cor1-2001; IEEE 802.11e-2003; and/or IEEE 802.11n™, in the IEEE 802.16™ standards ("IEEE Standard for Local and Metropolitan Area Networks—Part 16: Air Interface for Fixed Broadband Wireless Access System", Oct. 1, 2004), such as IEEE 802.16-2004/Cor1-2005 or IEEE 802.16e-2005, which may herein be referred to as the "IEEE 802.16e-2005" or "WiMAX" standards, and/or in the IEEE 802.15.1™ standards ("IEEE Standard for Local and Metropolitan Aarea Networks—Specific Requirements. Part 15.1: Wireless Medium Access Control (MAC) and Physical Layer (PHY) Specifications for Wireless Personal Area Networks (WPANs™)", Jun. 14, 2005), although the invention is not limited in this respect and other standards may be used. In some embodiments, attributes, compatibility, and/or functionality of wireless network 100 and components thereof may be defined according to, for example, the IEEE 802.16 standards (e.g., which may be referred to as a worldwide interoperability for microwave access (WiMAX)).

Embodiments or the invention may be used in a variety of applications including transmitters and receivers of a radio system, although the present invention is not limited in this respect. Radio systems specifically included within the scope of the present invention include, but are not limited to, network interface cards (NICs), network adaptors, mobile stations, base stations, access points (APs), gateways, bridges, hubs and cellular radiotelephones. Further, the radio systems within the scope of the invention may include cellular radiotelephone systems, satellite systems, personal communication systems (PCS), two-way radio systems, two-way pagers, personal computers (PCs) and related peripherals, personal digital assistants (PDAs), personal computing accessories and all existing and future arising systems which may be related in nature and to which the principles of the inventive embodiments could be suitably applied.

Reference is made to FIG. 1, which schematically illustrates a wireless network 100 and stations (STAs) 130 and/or 170 for communicating within wireless network 100, according to an embodiment of the invention. Embodiments of the present invention may reduce the quantity and/or time of signaling used for STA 130 to access resources to exit an idle mode, for example, before a predetermined period of time, by STA 170 locally storing the resources. Locally storing resources in wireless network 100 may include, for example, storing resources in a local device (e.g., STA 170) in wireless network 100, storing resources in a device in substantially direct communication with STA 130 (e.g., that may communicate with STA 130 without an intermediary device), storing resources in a device in a device that is typically not a backend component. Backend components of wireless network 100 may include, for example, components that are typically not in substantially direct communication with STA 130 (e.g., a wireless mobile device) and may use an intermediary device (e.g., STA 170, such as a base station) to communicate with STA 130. Other or different locations and benefits may be realized.

Wireless network 100 may facilitate wireless access, signal requests, signal responses, and/or other communications, for example, between STAs 130 and 170, for example, via wireless communications channels or mediums 110, 112, 114, and/or 116. In one embodiment, STA 130 may communicate or transmit request signals for entering and/or exiting idle, for example, to a base station (e.g., STA 170), for example, which may in turn communicate or request verification, authorization, path resources, etc., via "backend" or non-locally stored components of STA 170 or wireless network 100, such as, a paging agent (PA) 172, a data path function (DPF) 174, a paging controller (PC) 176, a DPF relay 178, an anchor data path (DP) 180, an anchor paging controller (APC) and location register (LR) 182, and an anchor authenticator 184. Such components may exchange messages (e.g., signals transmitted in operations 205 to 245, described in reference to FIGS. 2-4), for example, for requesting and/or notifying wireless network 100 components that STA 130 may enter and/or exit into an idle mode of operation and/or for locally retaining wireless network 100 resources for STA 130 in an idle mode of operation. The base station (e.g., STA 170) may include, for example, a timer 192, such as, a management resource holding timer (MRHT) or other resource holding timer, for determining and/or communicating when a predetermined period of time has expired. For example, the predetermined period of time may include the time for locally storing wireless network 100 resources for STA 130 when in an idle mode of operation.

In some embodiments, STA 130 and STA 170 may include controllers or processing circuits 150 and 173, respectively, including logic (e.g., including hard circuitry, processor and software, or a combination thereof) to execute a network re-entry process using the locally stored network resources.

In some embodiments, there may be a substantially high probability that a wireless device, for example, STA 130, may request to exit the idle mode of operation before a predetermined time period (e.g., 5-10 minutes) expires. For example, STA 130 may be triggered to exit the idle mode, for example, by incoming latent, fragmented, and/or delayed communications. Thus, when network resources for STA 130, which may be used to exit the idle mode of operation, are locally available and/or stored, STA 130 may exit the idle mode of operation by locally executing a network re-entry process faster than executing when relying on non-locally stored resources, for example, from "backend" wireless network components. STA 170 may be pre-designated or selected for locally storing network resources for each of one or more STAs 130 in wireless network 100 when STA 170 may, for example, minimally enter idle mode, be minimally mobile, have access to network resources, be in communication with backend wireless network 100 components or have other features. In some embodiments, it may be desirable to have a readily accessible STA 170 (e.g., a base station) for retrieving resources for an idle STA 130 (e.g., in which stored resources may be less accessible while STA 130 is in an idle mode). In other embodiments, each of one or more STAs 130 may locally store the wireless network 100 resources.

In one embodiment, antenna 171 may receive a request from STA 130 to exit the idle mode of operation. Processor 175 of STA 170 may retrieve the network resources for STA 130, for example, from local memory 173. Processor 150 of STA 130 may execute a network re-entry process using locally stored network resources.

According to embodiments of the invention, processor 150 may execute a network re-entry process using, for example, locally stored network resources. In some embodiments, STAs 130 may exit the idle mode of operation and execute a network re-entry process in response to, for example, incoming communications. In one embodiment, STA 130 may include an override function 157 (e.g., an "on/off" switch, a motion detector in a mouse or keyboard, cellular telephone buttons, etc.) to accept a request from a user for the second wireless device to exit the idle mode of operation. In some embodiments, STAs 130 may include one or more antennas 148 and 149 and STA 170 may include one or more antennas 171.

In one embodiment, STAs 130 may include a radio frequency (RF) interface 140 and/or a medium access controller (MAC)/baseband processor circuit 150. In one embodiment, RF interface 140 may include a component or combination of components adapted for transmitting and/or receiving single carrier or multi-carrier modulated signals although the inventive embodiments are not limited to any specific over-the-air interface or modulation scheme. RF interface 140 may include, for example, a receiver 142, a transmitter 144 and/or a frequency synthesizer 146. Interface 140 may include bias controls, a crystal oscillator and/or one or more antennas 148 and/or 149. In another embodiment, RF interface 140 may use external voltage-controlled oscillators (VCOs), surface acoustic wave filters, intermediate frequency (IF) filters and/or RF filters, as desired. Due to the variety of potential RF interface designs an expansive description thereof is omitted. STA 170 may include an antenna 171 for communicating with STA 130 and/or other network components 185.

Processing circuit 150 may communicate with RF interface 140 to process, receive and/or transmit signals and may include, for example, an analog-to-digital converter 152 for down converting received signals, a digital-to-analog converter 154 for up converting signals for transmission. Further, processor circuit 150 may include a baseband or physical layer (PHY) processing circuit 156 for PHY link layer processing of respective receive/transmit signals. Processing circuit 150 may include, for example, a processing circuit 159 for medium access control (MAC)/data link layer processing. Processing circuit 150 may include a memory controller 158 for communicating with processing circuit 159 and/or a base station management entity 160, for example, via interfaces 155.

In some embodiments of the present invention, PHY processing circuit 156 may include a frame construction and/or detection module, in combination with additional circuitry such as a buffer memory, to construct and/or deconstruct super-frames as in the embodiments previously described. Alternatively or in addition, MAC processing circuit 159 may share processing for certain of these functions or perform these processes independent of PHY processing circuit 156. In some embodiments, MAC and PHY processing may be integrated into a single circuit if desired.

Each of STAs 130 and 170 may be, for example, a base station, an access point, a subscriber station, a terminal, a node, an apparatus, a mobile station, a subscriber station, a base station, a network access station, a hybrid coordinator, a wireless router, a NIC and/or network adaptor for computing devices, or a mobile station or other device. Accordingly, functions and/or specific configurations of STAs 130 and 170 described herein, may be included or omitted in various embodiments of STAs 130 and 170, as suitably desired. Particularly, STA 170 may include components comparable to those described in reference to STA 130 and/or or other suitable components.

Embodiments of STAs 130 and 170 may be implemented using single input single output (SISO) architectures. However, certain implementations may include multiple antennas (e.g., antennas 148 and 149) for transmission and/or reception using adaptive antenna techniques for beamforming or spatial division multiple access (SDMA) and/or using multiple input multiple output (MIMO) communication techniques.

The components and features of STAs 130 and 170 may be implemented using any suitable combination of discrete circuitry, application specific integrated circuits (ASICs), logic gates and/or single chip architectures. Further, the features of STAs 130 and 170 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example wireless network 100 and STAs 130 and 170 shown in the block diagram of FIG. 1 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments of the present invention.

Figure 2:
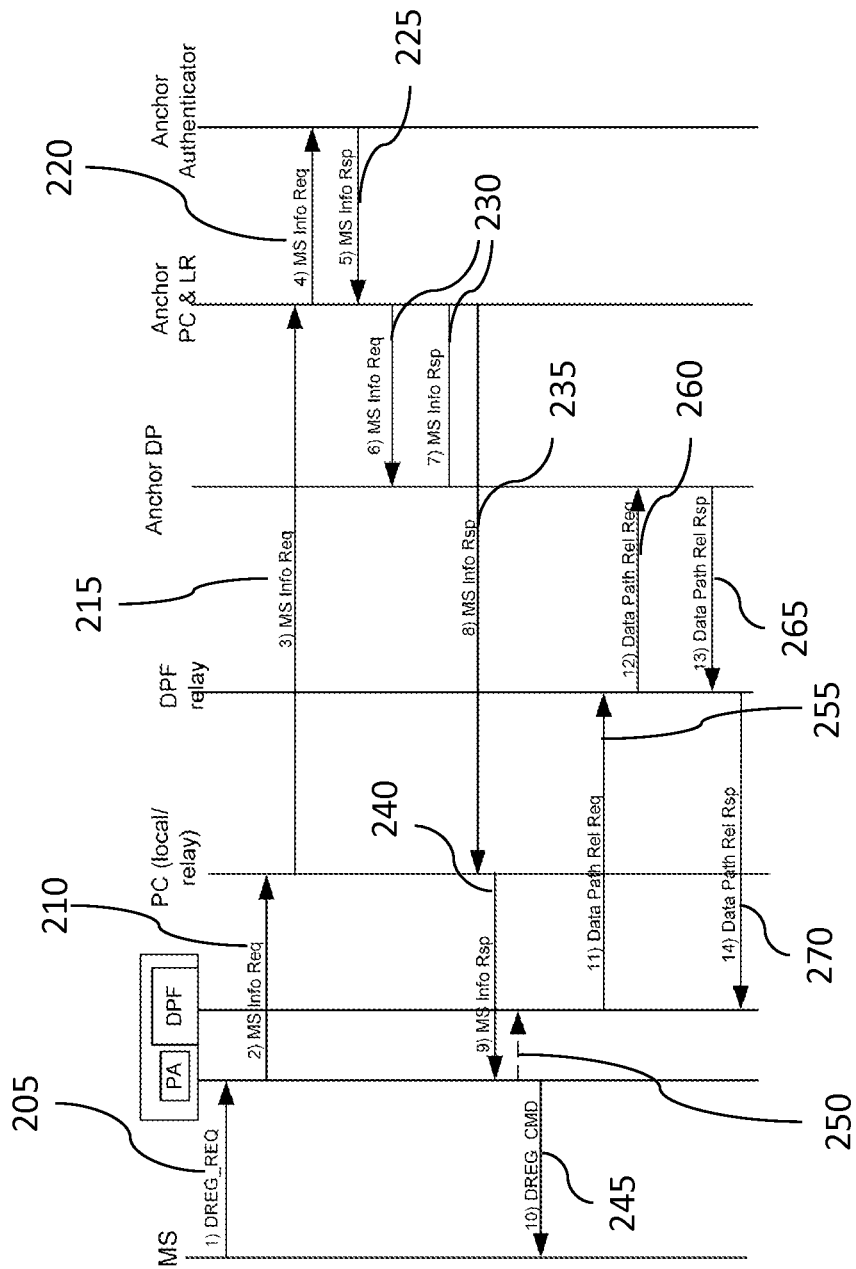
FIG. 2 is a flow chart of a mechanism for a wireless device to enter an idle mode of operation according to an embodiment of the present invention.

Reference is made to FIG. 2, which is a flow chart of a communication mechanism of a wireless device entering an idle mode of operation according to an embodiment of the present invention. Signaling schemes described herein may be communicated (e.g., transmitted and/or received) between or among wireless devices (e.g., STAs 130 and/or 170, and other devices not shown) over a wireless network (e.g., wireless network 100), via communications (e.g., communications 110, 112, 114, and/or 116). Communications depicted herein may enable a wireless device to communicate with a base station for entering an idle mode of operation and for the base station to retain network resources for the wireless device during the idle mode of operations.

In operation 205, an antenna (e.g., antenna 148 and/or 149 in a wireless device, such as, STA 130) may transmit one or more request signals (e.g., a deregistration request "DREG_REQ") for entering an idle mode of operation, for example, to a base station (e.g., STA 170), for example, via a PA (e.g., PA 172) and/or a DPF (e.g., DPF 174).

In operation 210, the base station may transmit the request signals, for example, to a paging controller (e.g., a local and/or relay paging controller, such as PC 176).

In operation 215, the paging controller may transmit the request signals, for example, to an anchor paging controller and/or and location register (e.g., APC and LR 182).

In operation 220, the anchor PC and/or LR device may transmit the request signals, for example, to an anchor authenticator (e.g., anchor authenticator 184) for verifying the request.

In operation 225, the anchor authenticator may transmit one or more response signals, for example, to the request signals (e.g., transmitted in operation 205) to the anchor PC and/or LR, for example, based on a verification scheme.

In operation 230, the anchor PC and/or LR may transmit the request signals and the response signals, for example, to an anchor data path (DP) (e.g., anchor DP 180).

In operation 235, the anchor PC and/or LR may transmit the response signals, for example, to the paging controller (e.g., the paging controller of operation 210).

In operation 240, the paging controller may transmit the response signals, for example, to the base station, for example, via a PA and/or a DPF (e.g., the base station of operation 210).

In operation 245, the base station may transmit a command signal (e.g., a deregistration command "DREG CMD") to the wireless device (e.g., the wireless device of operation 205), for example, to command, notify, or indicate to, the wireless device that the device may enter into an idle mode of operation.

In operation 250, when the wireless device enters an idle mode of operation, the base station may locally store the network resources for the wireless device, for example, for when the device exits the idle mode after a substantially small period of time. The base station may store the network resources for the wireless device (e.g., in local memory 190 or other components) for a predetermined period of time, for example, until a timer (e.g., timer 192), such as, a MRHT or other resource holding timer, expires. The local storing of wireless network resources for the wireless device may provide local access to (e.g., for relatively efficient and fast use of) the network resources. The local storage of resources may be desirable since typically wireless devices may exit the idle mode within the predetermined (e.g., substantially small)

period of time after entering the idle mode. For example, the predetermined period of time (e.g., a MRHT value) may be on the order of minutes. For example, the predetermined period of time may be a period during which the wireless device is substantially and/or most likely to exit the idle mode, relative to other periods of time. For example, the time difference between transmitting in operation 245 and operation 255 may be approximately equal to the predetermined period of time or MRHT value.

In some embodiments, when the timer expires and the wireless device does not wake up in the predetermined period of time, a process may perform additional operations (e.g., of operations 255-270) for example, for breaking down data path resources retained for the wireless device in idle mode.

In operation 255, the DPF of the base station may transmit a data path request, for example, to a DPF relay (e.g., DPF relay 178).

In operation 260, the DPF of the base station may transmit the data path request, for example, to a DPF relay (e.g., DPF relay 178).

In operation 265, the anchor DP may transmit a response to the data path request, for example, back to the DPF relay.

In operation 270, the DPF relay may transmit the response to the data path request, for example, back to the DPF of the base station.

Other operations, series of operations, or combinations thereof, may be used.

Figure 3:
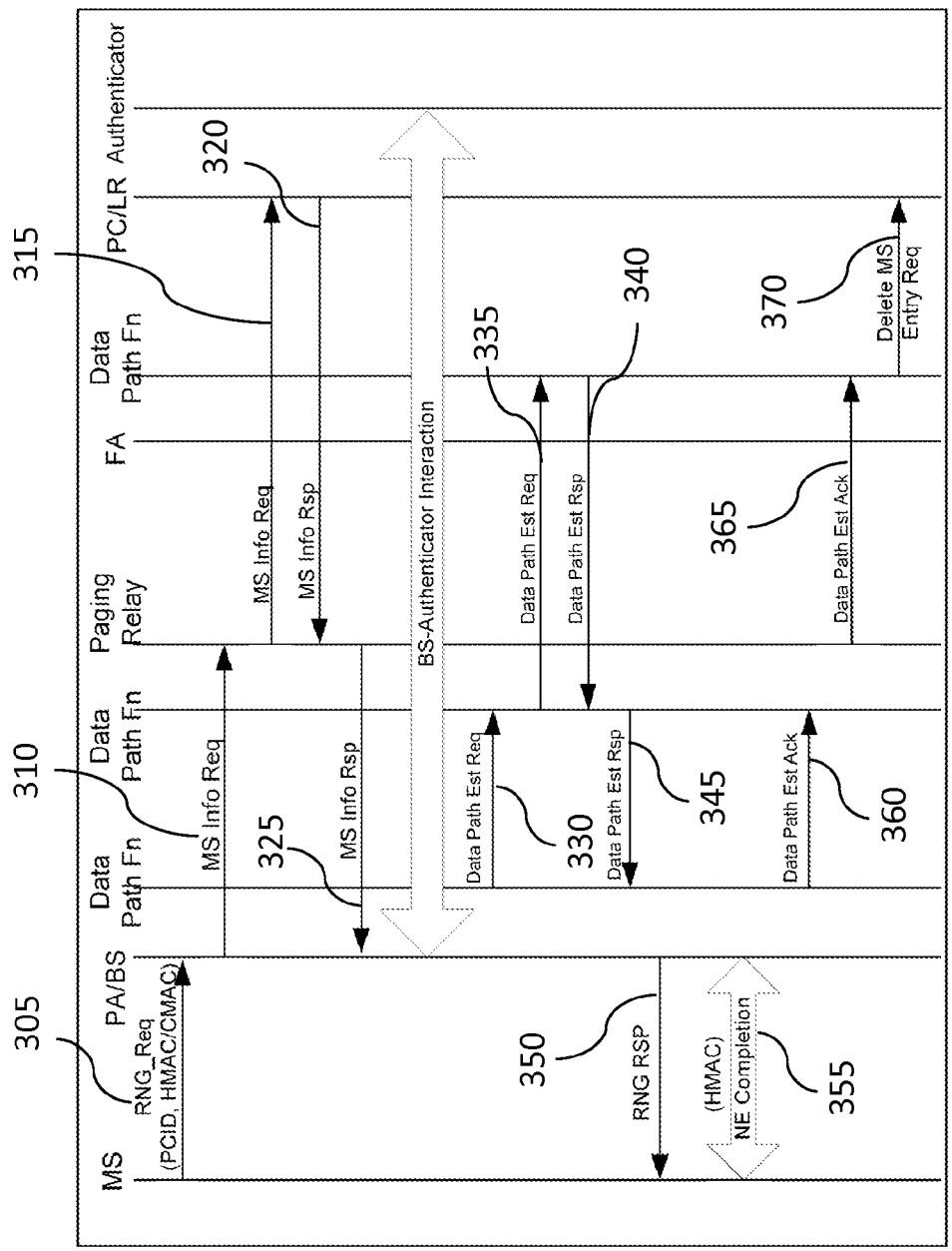
FIG. 3 is a flow chart of a mechanism for a wireless device to exit an idle mode of operation before a predetermined time period expires according to an embodiment of the present invention.

Reference is made to FIG. 3, which is a flow chart of a communication mechanism of a wireless device exiting an idle mode of operation before a predetermined time period expires according to an embodiment of the present invention. In some embodiments, when network resources for a wireless device are locally stored, FIG. 3 may include superfluous operations that may not be used by a device or process, for example, for a wireless device exiting an idle mode of operation. Signaling schemes described herein may be communicated (e.g., transmitted and/or received) between the wireless device (e.g., STAs 130 and/or 170) over a wireless network (e.g., wireless network 100), via communications (e.g., communications 110, 112, 114, and/or 116).

In operation 305, an antenna (e.g., belonging to a wireless device or STA 130) may transmit one or more request signals (e.g., a ranging request "RNG_req" including, for example, (PCID, HMAC/CMAC)) for exiting an idle mode of operation, for example, to a base station (e.g., STA 170), for example, via a PA (e.g., PA 172).

In operations 310-370, signals may be communicated between for example the base station and "backend" or non-local wireless network components (e.g., wireless network components 185) to notify, verify, and/or allow the wireless device to exit the idle mode of operation and re-enter the wireless network in an active mode of operation. In some embodiments, there may be a substantially high probability that the wireless device may exit the idle mode of operation substantially before the MRHT or a predetermined time period expires, for example, since communications may be fragmented or delayed. Thus, when resources for the wireless device may be available and/or stored locally to the wireless device, for example, in a base station in the same network as the wireless device and/or within the wireless device, for example, for the predetermined time period, communications between for example the base station and "backend" wireless network component (e.g., in operations 310-370) may be unnecessary and may interfere with, and result in delays to, other system signaling processes.

In operation 310, a base station, for example, via the PA, may transmit the request signals, for example, to a paging relay.

In operation 315, the paging relay may transmit the request signals, for example, to a paging controller and/or and location register (e.g., APC and LR 182).

In operation 320, the PC and/or LR may transmit one or more response signals to the request signals, for example, back to paging relay.

In operation 325, the paging relay may transmit the response signals, for example, to the base station and/or PA.

In operation 330, a first data path function (e.g., of backend or non-local network components) may generate and/or transmit a data path request signal, for example, for and/or to a second data path function (e.g., of backend or non-local network components).

In operation 335, the second data path function may generate and/or transmit the data path request signal, for example, to a third data path function.

In operation 340, the third data path function may generate and/or transmit a response to the data path request signal, for example, to the second data path function.

In operation 345, the second data path function may generate and/or transmit the response to the data path request signal, for example, to the first data path function.

In operations 330-345, signals may be communicated between for example the base station and "backend" wireless network components (e.g., including data path functions), for establishing a data path for network re-entry. In some embodiments, for example, depicted in the processes of FIG. 4, these operations may be unnecessary, for example, since the resources for the wireless device may be available and/or stored locally in the network (e.g., until the MRHT expires).

In operation 350, the base station, for example, via the PA, may transmit a command signal (e.g., a ranging response "RNG RSP") to the wireless device (e.g., the wireless device of operation 305), for example, to command, notify, or indicate to, the wireless device to exit the idle mode of operation and re-enter the wireless network and network entry (NE).

In operation 355, the wireless device and the base station communicate to establish, verify, and/or complete the network entry or exiting of idle mode for the wireless device.

In operation 360, the first data path may generate and/or transmit a data path established acknowledge signal, for example, for and/or to a second data path function.

In operation 365, the second data path function may generate and/or transmit the data path established acknowledge signal, for example, for and/or to a third data path function.

In operation 370, the third data path function may generate and/or transmit a request signal to delete the wireless device request signals for exiting the idle mode of operation, for example, to a network authenticator (e.g., anchor authenticator 184).

Other operations, series of operations, or combinations thereof, may be used.

Figure 4:
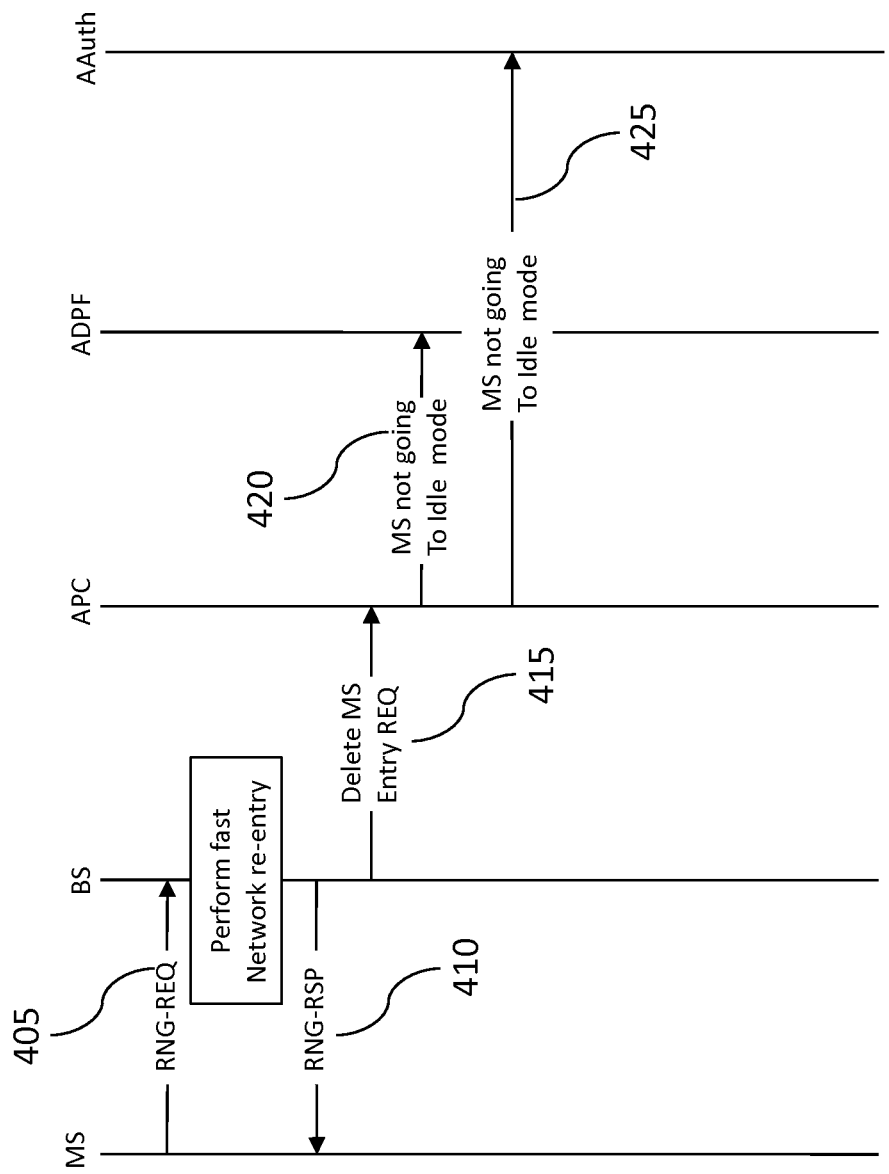
FIG. 4 is a flow chart of a mechanism for a wireless device to exit an idle mode of operation before a predetermined time period expires according to an embodiment of the present invention.

Reference is made to FIG. 4, which is a flow chart of a communication mechanism of a wireless device exiting an idle mode according to an embodiment of the present invention. In one embodiment, the base station has wireless network resources for the wireless device, stored locally in the base station, for example, before the predetermined time period expires. Network resources may include, for example, security context data, SBC context data, data paths for network re-entry, and/or other information, which may be used for waking up or activating the wireless device from an idle mode for re-entering the wireless network. Thus, when the wireless device exits idle mode, the base station may retrieve the resources, for example, from local memory, instead of, for example, the relatively slower backend network components (e.g., paging controller, location register, authenticator, etc., used in embodiments described in reference to FIG. 3) and may execute, for example, a "fast network re-entry" process.

In operation 405, an antenna (e.g., belonging to a wireless device or STA 130) may transmit one or more request signals (e.g., a ranging request "RNG_req") for exiting an idle mode of operation, for example, to a base station (e.g., STA 170).

In operation 410, the base station, may transmit a command signal (e.g., a ranging response "RNG_RSP") to the wireless device, for example, to command, notify, initiate, or indicate to, the wireless device to exit the idle mode of operation and re-enter the wireless network. The base station may access and/or transmit wireless network resources for the wireless device, which may be stored locally to, for example, network provider stations and other network managers, for the wireless device to exit the idle mode of operation and enter the wireless network, for example, using a fast network re-entry process.

In operation 415, the base station may transmit a request signal to delete the wireless device request signals for exiting the idle mode of operation, for example, to an anchor paging controller (e.g., anchor PC and/or LR 182). The anchor PC may delete the wireless device idle mode data entry a corresponding data base.

In operation 420, the anchor PC may transmit a signal indicating that the wireless device is not entering or in an idle mode of operations, for example, to an anchor data path function (DPF) (e.g., anchor DP 180).

In operation 425, the anchor PC may transmit a signal indicating that the wireless device is not entering or in an idle mode of operations, for example, to an anchor authenticator (e.g., anchor authenticator 184).

In some embodiments of the invention, operations 415-425, may include signaling backend components of the wireless network to update the activation status (e.g., idle, active, inactive, and/or other modes of operation) of the wireless device. Backend components of wireless network may include, for example, components that typically are not in direct communication with the wireless device and may use an intermediary device, such as, the base station to communicate with the wireless device. In some embodiments, the wireless network re-entry process may be executed or initiated (e.g., according to operation 410) prior to the signaling of the backend components of the wireless network to update the activation status of the wireless device.

Other processes, sequences, orders, and/or permutations of operations may be executed.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

The invention claimed is:

1. A method comprising:
   receiving at a first wireless device a request from a second wireless device to enter an idle mode of operation;
   receiving at the first wireless device network resource information from one or more backend network components, the network resource information including information for network re-entry of the second wireless device upon exiting the idle mode of operation;
   storing said network resources information in a local memory of said first wireless device; and
   if a request from the second wireless device to exit the idle mode of operation is received at the first wireless device within a predefined resource holding time period, retrieving the network resources information from the local memory and executing a network re-entry process for network re-entry of the second wireless device using the retrieved network resource information.

2. The method of claim 1, wherein the predefined resource holding time period comprises a predefined time period between receiving the network resource information and a time for transmitting to the backend network components a request to break down data path resources retained for the second wireless device, if the request to exit the idle mode of operation is not received.

3. The method of claim 1 comprising:
   if the request to exit the idle mode of operation is received within the resource holding time period, indicating to the backend network components that the second wireless device is not at the idle mode of operation; and
   if the request to exit the idle mode of operation is not received within the resource holding time period, transmitting to the backend network components a request to break down data path resources retained for the second wireless device.

4. The method of claim 1, wherein the network resource information comprises information of a data path for the second wireless device to execute the network re-entry.

5. The method of claim 1, wherein network resources information comprises security context data.

6. The method of claim 1 comprising if the request to exit the idle mode of operation is received after the resource holding time period, requesting the network resource information from the backend network components in response to the request to exit the idle mode of operation.

7. The method of claim 1 comprising the second wireless device transmitting the request when an incoming transmission is detected.

8. The method of claim 1 comprising transmitting a single message from the first wireless device to the backend network components in response to the request to exit the idle mode of operation, if the request to exit the idle mode of operation is received within the predefined resource holding time period.

9. The method of claim 1, wherein the second wireless device comprises a mobile station.

10. The method of claim 1, wherein the first wireless device comprises a base station.

11. The method of claim 1, wherein the first and second wireless devices are in the same network.

12. An apparatus comprising:
   a first wireless device to receive a request from a second wireless device to enter an idle mode of operation; to receive network resource information from one or more backend network components, the network resource information including information for network re-entry of the second wireless device upon exiting the idle mode of operation; to store the network resources in a local memory of said first wireless device; and, if a request from the second wireless device to exit the idle mode of operation is received within a predefined resource holding time period, to retrieve the network resources from the local memory and to execute a network re-entry process for network re-entry of the second wireless device using the retrieved network resource information.

13. The apparatus of claim 12 wherein, if the request to exit the idle mode of operation is received within the resource holding time period, the first wireless device is to indicate to the backend network components that the second wireless device is not at the idle mode of operation; and, if the request to exit the idle mode of operation is not received within the resource holding time period, the first wireless device is to transmit to the backend network components a request to break down data path resources retained for the second wireless device.

14. The apparatus of claim 12, wherein if the request to exit the idle mode of operation is received after the resource holding time period, the first wireless device is to request the network resource information from the backend network components in response to the request to exit the idle mode of operation.

15. The apparatus of claim 12, wherein the network resource information comprises information of a data path for the second wireless device to execute the network re-entry.

16. The apparatus of claim 12, wherein the first wireless device is to transmit a single message to the backend network components in response to the request to exit the idle mode of operation, if the request to exit the idle mode of operation is received within the predefined resource holding time period.

17. A system comprising:
a first wireless device including:
an antenna to receive a request from a second wireless device to enter an idle mode of operation; and to receive network resource information from one or more backend network components, the network resource information including information for network re-entry of the second wireless device upon exiting the idle mode of operation;
a local memory to store the network resource information;
and a processor to retrieve the network resource information from the local memory and to execute a network re-entry process for network re-entry of the second wireless device using the retrieved network resource information, if a request from the second wireless device to exit the idle mode of operation is received within a predefined resource holding time period.

18. The system of claim 17, wherein if the request to exit the idle mode of operation is received within the resource holding time period, the first wireless device is to indicate to the backend network components that the second wireless device is not at the idle mode of operation; and, if the request to exit the idle mode of operation is not received within the resource holding time period, the first wireless device is to transmit to the backend network components a request to break down data path resources retained for the second wireless device.

19. The system of claim 17, wherein if the request to exit the idle mode of operation is received after the resource holding time period, the first wireless device is to request the network resource information from the backend network components in response to the request to exit the idle mode of operation.

20. The system of claim 17, wherein the network resources information comprises information of a data path for the second wireless device to execute the network re-entry.

21. The system of claim 17, wherein the first wireless device is to transmit a single message to the backend network components in response to the request to exit the idle mode of operation, if the request to exit the idle mode of operation is received within the predefined resource holding time period.

22. A method comprising:
receiving at an active base station in a wireless network, a request from a wireless mobile device to enter an idle mode of operation;
locally storing at the base station network resource information from one or more backend network components of the wireless network, the network resource information including information for network re-entry of the wireless mobile device upon exiting the idle mode of operation;
and
upon receiving at the base station, within a predefined resource holding time period after receiving the network resource information, a request from the mobile wireless device to exit the idle mode of operation, retrieving the network resource information from the local memory, executing a network re-entry process for network re-entry of the wireless mobile device using the retrieved network resource information, and signaling the backend network components to update an activation status of the wireless mobile device after the network re-entry process is initiated.

23. The method of claim 22, wherein the backend network components comprise components that are not in direct communication with the wireless mobile device.

24. The method of claim 22, wherein the activation status of the wireless mobile device is selected from the group consisting of: active, idle, and inactive.

25. The method of claim 22, wherein signaling the activation status includes signaling an active status.

* * * * *

UNITED STATES PATENT AND TRADEMARK OFFICE
CERTIFICATE OF CORRECTION

PATENT NO. : 9,066,348 B2  
APPLICATION NO. : 11/907813  
DATED : June 23, 2015  
INVENTOR(S) : Muthaiah Venkatachalam Page 1 of 1

It is certified that error appears in the above-identified patent and that said Letters Patent is hereby corrected as shown below:

In the Claims

In column 10, line 3, in claim 1, delete "resources" and insert -- resource --, therefor.

In column 10, line 8, in claim 1, delete "resources" and insert -- resource --, therefor.

In column 10, line 32, in claim 5, delete "resources" and insert -- resource --, therefor.

In column 10, line 60, in claim 12, delete "network resources" and insert -- network resource information --, therefor.

In column 10, line 64, in claim 12, delete "network resources" and insert -- network resource information --, therefor.

In column 12, line 12, in claim 20, delete "resources" and insert -- resource --, therefor.

In column 12, line 33, in claim 12, delete "mobile wireless device" and insert -- wireless mobile device --, therefor.

Signed and Sealed this  
Twelfth Day of April, 2016

Michelle K. Lee  
*Director of the United States Patent and Trademark Office*